(12) United States Patent
Yang et al.

(10) Patent No.: US 12,487,914 B2
(45) Date of Patent: Dec. 2, 2025

(54) SIMULATED SOFTWARE FEATURES IN A SIMULATED SANDBOX WITHIN A PRODUCTION ENVIRONMENT

(71) Applicant: Salesforce, Inc., San Francisco, CA (US)

(72) Inventors: Wenying Yang, San Mateo, CA (US); Billy Ma, San Mateo, CA (US); Vandit Garg, Antioch, CA (US)

(73) Assignee: Salesforce, Inc., San Francisco, CA (US)

( * ) Notice: Subject to any disclaimer, the term of this patent is extended or adjusted under 35 U.S.C. 154(b) by 224 days.

(21) Appl. No.: 18/329,332

(22) Filed: Jun. 5, 2023

(65) Prior Publication Data

US 2024/0338302 A1  Oct. 10, 2024

Related U.S. Application Data

(60) Provisional application No. 63/495,298, filed on Apr. 10, 2023.

(51) Int. Cl.
*G06F 11/3698* (2025.01)

(52) U.S. Cl.
CPC .............. *G06F 11/3698* (2025.01)

(58) Field of Classification Search
CPC .................................. G06F 11/3698
USPC ................................ 717/105–140
See application file for complete search history.

(56) References Cited

U.S. PATENT DOCUMENTS

| | | | | |
|---|---|---|---|---|
| 6,041,263 A | * | 3/2000 | Boston | G05B 17/02 |
| | | | | 700/62 |
| 7,523,127 B2 | * | 4/2009 | Chen-Wright | G06F 16/289 |
| | | | | 707/999.102 |
| 8,494,812 B2 | * | 7/2013 | Celestini | G05B 23/0221 |
| | | | | 702/182 |
| 8,566,792 B2 | | 10/2013 | Chasman et al. | |
| 8,671,385 B2 | * | 3/2014 | Byrd | G06F 21/604 |
| | | | | 717/106 |
| 8,677,308 B2 | * | 3/2014 | Hopkins | G06F 8/30 |
| | | | | 717/106 |

(Continued)

OTHER PUBLICATIONS

Dewald et al, "ADSandbox: Sandboxing JavaScript to fight Malicious Websites", ACM, pp. 1-6 (Year: 2010).*

(Continued)

*Primary Examiner* — Anil Khatri
(74) *Attorney, Agent, or Firm* — Nicholson De Vos Webster & Elliott LLP

(57) ABSTRACT

Implementations(s) for simulated software features are described. Responsive to a request for accessing a first web page, first code for the first web page is caused to be retrieved from a first web application. Responsive to the first code, the first web page is caused to be displayed with an access to a simulation of a feature that may be used in the first web application. Responsive to a user's selection of the access, the first web page is caused to be updated to include a first user interface (UI) component that identifies a second web page; responsive to the updated first web page, second code for the second web page is caused to be retrieved from a second web application; and responsive to the second code, the second web page is caused to be displayed inside the first UI component to allow for the simulation.

18 Claims, 8 Drawing Sheets

(56) References Cited

U.S. PATENT DOCUMENTS

| | | | |
|---|---|---|---|
| 8,843,884 B1* | 9/2014 | Koerner | G06F 8/34 |
| | | | 717/109 |
| 9,208,235 B1* | 12/2015 | Liu | G06F 16/951 |
| 9,690,808 B2 | 6/2017 | Roy-Faderman et al. | |
| 9,973,550 B2 | 5/2018 | Haskins et al. | |
| 10,108,535 B2* | 10/2018 | Aggarwal | G06F 11/3672 |
| 10,423,907 B2 | 9/2019 | Wang et al. | |
| D921,014 S | 6/2021 | Garg et al. | |
| 11,030,082 B1 | 6/2021 | Ma et al. | |
| D924,901 S | 7/2021 | Garg et al. | |
| 11,086,764 B2 | 8/2021 | Ma et al. | |
| 11,237,889 B1 | 2/2022 | Ma | |
| 11,281,563 B2 | 3/2022 | Ma et al. | |
| 11,429,577 B2 | 8/2022 | Ma et al. | |
| 11,436,005 B2 | 9/2022 | Ma et al. | |
| 11,494,286 B2 | 11/2022 | Ma et al. | |
| 11,537,503 B2 | 12/2022 | Chen et al. | |
| 11,573,880 B2 | 2/2023 | Ma et al. | |
| 11,797,820 B2* | 10/2023 | Chakraborti | G06F 16/24578 |
| 11,954,424 B2* | 4/2024 | Samulowitz | G06F 40/169 |
| 12,106,860 B1* | 10/2024 | Guttikonda | G16H 50/30 |
| 2012/0180029 A1* | 7/2012 | Hill | G06Q 10/06 |
| | | | 717/135 |
| 2016/0112572 A1 | 4/2016 | Ma et al. | |
| 2020/0082001 A1 | 3/2020 | Chen et al. | |
| 2020/0249915 A1 | 8/2020 | Ma | |
| 2020/0293428 A1* | 9/2020 | Zhang | G06F 11/3612 |
| 2021/0149953 A1 | 5/2021 | Garg et al. | |
| 2023/0108375 A1 | 4/2023 | Ma et al. | |

OTHER PUBLICATIONS

Jia et al, "The "Web/Local" Boundary Is Fuzzy: A Security Study of Chrome's Process-based Sandboxing", ACM, pp. 1-14 (Year: 2016).*

Agate et al, "A Simulation Software for the Evaluation of Vulnerabilities in Reputation Management Systems", ACM, pp. 1-30 (Year: 2021).*

Tan et al, "OSPtrack: A Labeled Dataset Targeting Simulated Execution of Open-Source Software", IEEE, pp. 1-5 (Year: 2025).*

Hlupic et al, "SIMSELECT : a System for Simulation Software Selection", ACM, pp. 1-8 (Year: 1995).*

Ben Shaul, N., "Design to code: what does Anima do differently," Anima Blog, Jul. 29, 2021, pp. 1-6.

Ben Shaul, N., "How to export Figma to HTML," Anima Blog, Jan. 31, 2022, pp. 1-7.

Builder.io, "Builder.io—Figma to HTML, React, and more," Version 26 dated Aug. 30, 2022, downloaded from <https://www.figma.com/community/plugin/747985167520967365/Builder.io---Figma-to-HTML,-React,-and-more/Builder.io-Figma-to-HTML%2C-React%E2%80A6/Builder.io-Figma-to-HTML%2C-React%2C-and-more> on Apr. 10, 2023, pp. 1-8.

Herzog, M., "How to create your first API-backed Figma plugin that pulls in API data," Medium, Bootcamp, Dec. 5, 2022, pp. 1-11.

* cited by examiner

SIMULATED SOFTWARE FEATURES IN A SIMULATED SANDBOX WITHIN A PRODUCTION ENVIRONMENT

CROSS-REFERENCE TO RELATED APPLICATIONS

This application claims the benefit of U.S. Provisional Application No. 63/495,298, filed Apr. 10, 2023, which is hereby incorporated by reference.

TECHNICAL FIELD

One or more implementations relate to the field of simulation of software features; and more specifically, to providing, within a production environment, access to a simulated sandbox within which are provided simulated software features.

BACKGROUND ART

Software may continue to evolve after it has been deployed to a production environment. For example, a new or updated feature may be deployed to the production environment after it has been developed by a software provider. The feature may include a capability (or a grouping of related capabilities) that allows a user to complete a task or a set of related tasks. In some cases, the feature may require a license before it is permitted to be enabled for a user. And in some cases, even when the feature is covered under an existing license, the user may not want to enable it and adopt a change to the software version in the production environment without trying it out first. In such cases, the feature may stay disabled until the user decides to enable it.

In these situations, the software provider may set up and provide an environment that is separate from the production environment (e.g., a sandbox environment) that has the feature enabled for the user to try out. Such a separation protects the production environment from unintended changes (e.g., to the production data) that may result from trying out a new or updated feature directly in the production environment. In the case of a software provider on a cloud-based platform (e.g., a SaaS application provider), the software provider may set up and provide a sandbox environment for an organization (by way of example and not limitation, in a multi-tenant architecture, for a tenant on the platform).

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

The following description describes implementations for providing access to a simulation of a feature (sometime also referred to as feature preview) where the simulation is implemented in a web application deployed in a simulated sandbox environment (sometimes referred to as a simulated sandbox application), while a user is using a web application deployed in a production environment (sometimes referred to as a production application), in a way that does not require the user to leave the production application. In particular, the user may access the simulated feature via a user interface (UI) of the simulated sandbox application (e.g., a first web page displayed in a web browser) inside a UI of the production application (e.g., a second web page displayed in the same web browser). The feature being simulated is a feature that can be used in the production application, such as a feature for which the user does not have a license, a disabled feature for which the user has a license, an enabled feature for which the user has a license but has not used, a feature that may be implemented in the production application in the future, etc.

Figure 1A:
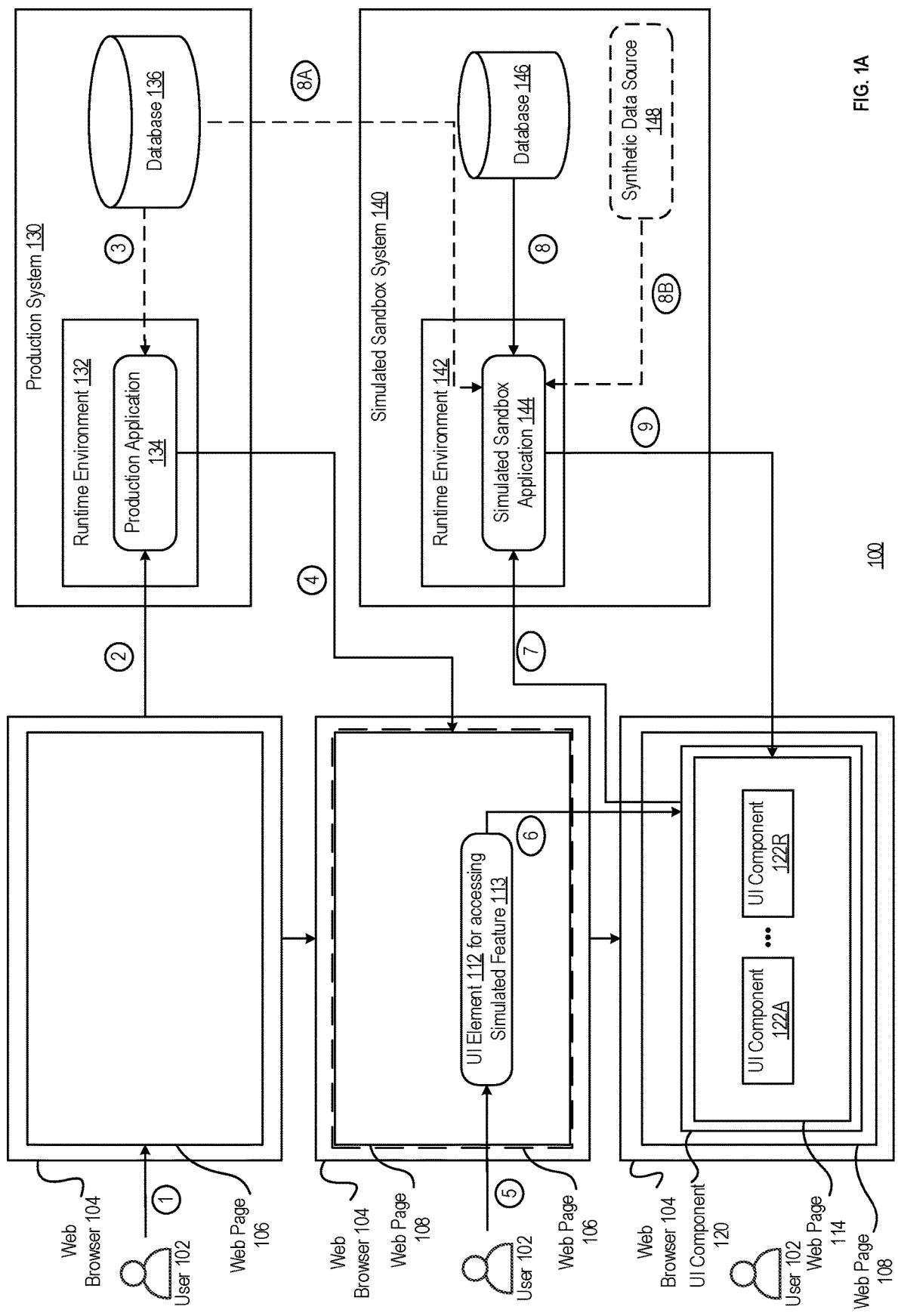
FIG. 1A is a diagram illustrating one aspect of simulated feature(s) in a simulated sandbox environment within a production environment according to some example implementations.

FIG. 1A is a diagram illustrating one aspect of simulated feature(s) in a simulated sandbox environment within a production environment according to some example implementations. The environment 100 includes a web browser 104 on an end user device (not shown), a production system 130, and a simulated sandbox system 140. The production system (e.g., a system 440 shown in FIG. 4B) provides a production environment and therein deployed is the latest version of application(s) that is ready (e.g., has successfully passed functionality testing, performance testing, etc.) for end-users to directly interact with. Such application(s) may be web application(s) (also referred to as web-based application(s)), such as a production application 134 (which may be a SaaS application). Such application(s) are executed in a runtime environment (e.g., a runtime environment 132).

The simulated sandbox system 140 (e.g., a system 440 in FIG. 4B) provides a simulated sandbox environment and therein deployed are application(s) (e.g., a web application, such as a simulated sandbox application 144 (which may be a SaaS application)) that are implemented to simulate feature(s) that can be used in the application(s) deployed in the production system 130 (e.g., the production application 134).

In the case of features that already exist in the production application 134, the simulated sandbox application 144 is implemented to simulate only a subset of features that can be used in the production application 134. For example, the subset may include a feature for which the user does not have a license. In such a case, the user may not be aware of the feature or may be aware of the feature but desire to try it out before deciding to purchase the license for the feature. The subset may include a disabled feature for which the user has a license. In such a case, the user may not be aware of the feature or may be aware of the feature but desire to try it out before deciding to enable the feature. The subset may include an enabled feature for which the user has a license but has not used. In such a case, the user may be aware of the feature but may not be familiar with what the feature does and/or how the feature works (such as how the production data may be affected) and thus may not be comfortable with using the feature before trying it out outside the production system 130. Such a user may be identified by implementing tracking of feature usage by users, e.g., within the production application 134. In some implementations, a simulated feature does not simulate a feature that already exists in the production application 134 and may simulate a feature that the software provider is considering adding to a later/future version of the production application 134 (i.e., it is not part of the current version of the production application 134). In such a case, the software provider may provide a limited group of users access to the simulation of such a potential future feature to obtain feedback, make modification, and/or decide whether to add the feature to the production application 134.

Each simulated feature in the simulated sandbox application 144 may be implemented to simulate one or more capabilities of a feature that can be used in the production application 134. In some implementations, a simulated feature implements a subset of capability(s) of a feature (e.g., key/representative capability(s) of a feature). In other implementations, a simulated feature implements all the capability (s) of a feature.

Each simulated capability may allow a user to complete a task or a set of related tasks. A simulated capability may allow a user to view some information. In some cases, the information may simply be the stored data associated with the user or, in a multitenant architecture, may be the stored data associated with the organization to which the user belongs. In some cases, the information may be computed information based on a more sophisticated system functionality and may require a license to access it. And the user may need to initiate an action before the information is presented to the user as the effect of the action, such as clicking on an interactive UI element (e.g., some text, an icon, or a tab that is associated with a hyperlink). In some cases, the presented information may replace the content previously presented on the web page ("content replacement example"). In some cases, the presented information may be displayed in a different location of the web page such that the previously presented content is also visible to the user ("additional content example"). Further, the presented information may itself be interactive and may allow the user to initiate other action(s) to access additional information. In such a manner, a simulated capability may be experienced by the user through a flow of user interactions where each user interaction includes a user action and the presentation of the result of the user action.

A simulated capability may indicate the presented information above is editable and may allow a user to update it. For example, a data cell in a data table may display its data as a text element (e.g., using a td element) and a pencil icon next to the data. When the user clicks on the pencil icon, as a result the data cell becomes an input element holding the value of the text element. After the user makes edits in the input element, the user may click elsewhere on the web page and as a result the input element returns to be a text element again, which now reflects the edits. In such a manner, the user has experienced the simulated capability of updating the presented information through a flow of two user interactions. And as seen in this case, a simulated feature may include more than one simulated capability and more than one flow of user interaction(s).

A simulated capability may allow a user to enter new information. For example, a user may click on an interactive UI element on the web page and a new data form (e.g., a new account form) may be presented as an overlay (e.g., implemented using CSS with a z-index of greater than 0), which appears above the web page and renders the web page unactionable. This completes one user interaction. As the user further interacts with the new account form (e.g., entering data, saving data, etc.), each user action is followed by the presentation of the result of the action. In such a manner, the user experiences the simulated capability through a flow of user interactions.

The simulated capabilities described herein may be implemented using the client-side of the simulated sandbox application 144 without reloading the entire web page that is displayed in the browser (e.g., by requesting a new web page from the server-side of the simulated sandbox application 144). Such a client-side of a web application (also referred to as a client-side application) may be referred to as a single-page application or single-page interface. In particular, flow(s) of user interactions in the simulated capabilities described herein may be implemented using navigation (sometimes referred to as routing) between the UI components (e.g., that is supported by client-side frameworks described herein).

A user 102 may interact with the production application 134 via the client side of the production application 134. The client-side of the production application 134 may be code (e.g., code for a web page (e.g., a web page 106), which may include html code, javascript code, Cascading Style Sheets (CSS) code, etc.) that is executable (e.g., by a browser engine and/or javascript engine) in a web browser (e.g., the web browser 104). Such code (e.g., code for the web page 106) is first retrieved (not shown) from the production application 134 and then executed in the web browser 104 on the end user device (e.g., displayed for the user 102 to interact with). In this case, the web page 106 allows the user to navigate to a different web page of the production application 134, i.e., a web page 108. This navigation may be a result of a user clicking on a UI element, which directs to the URL of the web page 108. At operation 1, the user 102 navigates to web page 108. In response, at operation 2, the end user device directs (e.g., via web browser 104) the user's 102 request for the web page 108 to the production application 134. In response, at operation 4, the production application 134 sends back the code for the web page 108 to the web browser 104. In some implementations, the production application 134 retrieves the code from a datastore (e.g., database 136) and sends the retrieved code to the web browser 104. Also, in some implementations, the production application 134 retrieves (e.g., from the database 136, from a service (e.g., application programing interface (API)-based), etc.) data required by the programming logic in the code. In such implementations, the production application 134 performs server-side rendering, e.g., rendering the html code based on the retrieved data and/or the javascript code and then sending the rendered html code and the rest of the code (e.g., javascript code, CSS code) to the web browser 104. In this case, the client-side of the production application 134 does not need to request the data required by the programing logic in the code after having retrieved the code from the production application 134. Alternatively, client-side rendering may be performed (not shown). For example, in response to receiving the code from the production application 134, the web browser 104 may request the data required by the programming logic in the code from the production application 134, e.g., when the web page 108 is being rendered in the web browser 104.

Following operation 4, an interactive UI element 112 for accessing simulation 113 of a feature (also referred to as a simulated feature 113) is displayed as part of the web page 108 in the web browser 104. Whether to display the interactive UI element 112 on the web page 108 may be based on determining whether the web page 108 is configurable to provide access to the simulated feature 113. The determination may include the production application 134 querying a simulated feature registry described herein, e.g., to determine whether an identifier of the web page 108 is part of a simulated feature record (e.g., as part of operation 3). The interactive UI element 112 (e.g., a button, etc.) allows the user to choose to access the simulated feature 113. The interactive UI element 112 may also include a location identifier (e.g., a URL) of a web page 114 (e.g., as a parameter being passed to the event handler for a user-initiated event, such as when a user chooses to access the simulated feature 113). The web page 114 is a web page of the simulated sandbox application 144 that allows for the simulated feature 113. In this manner, the displayed web page in the browser 104 transitions from the web page 106 to the web page 108. See also FIG. 2A for an example UI for the operation 4.

In response to an event initiated by the user 102, the client-side of the production application 134 (e.g., the code for the web page 108) may perform operation(s) on the client side (e.g., by manipulating the web page displayed in the web browser 104 (e.g., the web page 108)). The client-side of the web application may implement such client-side manipulation(s) by manipulating a data representation of the displayed web page (e.g., a document object model (DOM) implemented according to the world wide consortium (W3C) standard). In some implementations, the manipulation may be implemented using javascript code that directly changes the DOM (e.g., by invoking the DOM API after the event is caught by the event handler registered with the UI element the user has interacted with). In some implementations, the manipulation may be implemented using a client-side framework described herein. When used to implement the client-side of a web application, such a client-side framework implements the code that manipulates the DOM while allowing an application developer to write more declarative code (e.g., without directly invoking the DOM API). Continuing with the above example, at operation 5, the user 102 selects the interactive UI element 112 to access the simulated feature 113. In response, the event handler code causes the performance of one or more operations. For example, at operation 6, UI component 120 is inserted to the DOM of web page 108 (e.g., via javascript code directly invoking the DOM API or via a client-side framework implementation). The UI component 120 may include a UI element (e.g., an iframe element) that identifies, as a resource to request, the URL of the web page 114 (e.g., that is passed from a call to the interactive UI element's 112 event handler). The code for the UI component 120 is retrieved as part of the code for the web page 108 and in such a case the UI component 120 stays hidden until the event of the user 102 selecting interactive UI element 112. In some implementations, the code for the UI component 120 is retrieved (not shown) (e.g., by the code of the web page 108 from the production application 134) in response to the event of the user 102 selecting the interactive UI element 112.

Further, in response to the web page 114 being identified in the UI component 120 as a resource to request, at operation 7, the UI component 120 (via the web browser 104) requests the web page 114 from the simulated sandbox application 144.

In response to the request from the UI component 120, the simulated sandbox application 144 performs or causes the performance of one or more operations. Continuing with the above example, at operation 8, the simulated sandbox application 144 retrieves the code for the web page 114 from a datastore (e.g., database 146) e.g., based on a unique identifier for the simulated feature 113 (which may be derived from the URL for the web page 114), such as a simulated feature name (which may include one text value or a combination of multiple text values). The code for the web page 114 may include code for more than one UI components (e.g., UI components 122A-R).

The code for the web page 114 may be created in different ways. In some implementations, it may be manually created/written by an application developer. In other implementations, it may be created (e.g., by user experience (UX)/UI designer) using tools (e.g., plugins to a design tool) that convert design files (e.g., component-based design files) to interactive UI component code. In particular, each UI component is defined in html, javascript, and CSS code, e.g., according to the client-side frameworks described herein. Examples of such tools include Figma to code plugins by Anima, Builder.io, Webflow, and the like. In both of these situations, when the code for the web page 114 is created, it may be stored in database 146 under a unique identifier for the simulated feature 113, e.g., for later retrieval. Also, the unique identifier for the simulated feature 113 may be stored as part of a simulated feature record in a simulated feature registry (not shown) in the database 146. The simulated feature record may also include field value(s) that identify the web page(s) of production application 134 that are configurable to provide access to the simulated feature 113. The simulated feature registry may be copied to the database 136, e.g., to be used by the production application 134 to determine whether a web page is configurable to provide access to a simulated feature.

While interacting with UI components provided by the production application, the user 102 is able to see data provided from database 136 (that is "production data"), and typically add, modify, and/or delete the production data and have those changes reflected in the production data in the database 136. In contrast, the UI components provided by the simulated sandbox application 144 (e.g., UI components 122A-122R) will allow the user to see some initial data. And in some cases the UI components will allow the user add, modify, and/or delete that initial data, but any such changes will not be reflected in the database 136. The source of this initial data may be a copy of some production data from database 136 (see circled 8A) and/or synthetic data source 148 (see circled 8B). Thus, the code for none of the UI components in the web page 114 is implemented to update the production data in the production system 130. More generally, none of the web pages in the simulated sandbox application 144 is implemented to update the production data in the production system 130. In such a manner, no changes to the production data in the production system 130 will be caused by a user's (e.g., the user 102) interaction(s) with the simulated sandbox application 144.

In some implementations, the synthetic data source 148 may be implemented as an API simulator as described in U.S. Pat. No. 11,030,082 issued on Jun. 8, 2021 and titled "APPLICATION PROGRAMMING INTERFACE SIMULATION BASED ON DECLARATIVE ANNOTATIONS." In such an implementation, synthetic data following desired data formats will not be retrieved from data storage or the like but will be generated on-demand programmatically (e.g., upon API requests based on an API schema), e.g., before being presented to the user 102. In addition, the user 102 may modify the generated synthetic data and the modifications to the generated synthetic data may be stored in different types of context (e.g., a request, a single session, or a multiple-session/global context) for the user 102 to view throughout the simulation 113. Such implementations have advantages over the prior art. For instance, if a sandbox environment does not already exist, then it must be provisioned with data for sandbox testing (which can take several hours, especially if the sandbox is to have data that resembles the production data), e.g., in response to a user's request. Here, the API simulator supplies synthetic data in desired data format(s) (e.g., in data format(s) that resemble the production data) without the effort of an application provider provisioning such data or the effort of a user going through a manual process of requesting it and waiting for it. Regardless of whether a sandbox environment is pre-provisioned or provisioned on request, the storage need for the provisioned data may incur one-time/on-going costs. In contrast, the API simulator only stores the initial/updated synthetic data at a request, a single session, or a multi-session level. As a person skilled in the art would understand, such mechanism(s) store data temporarily and thus no long-term storage is required.

Following operation 8 (and, in some implementations, operations 8A and/or 8B), at operation 9, the simulated sandbox application 144 sends the code for the web page 114 (including, e.g., the code for UI components 122A-R) to the web browser 104, which in response creates a separate DOM for the web page 114 inside the DOM for the web page 108. See also FIG. 2B for an example UI for the operations 6-9.

Accessing the simulated sandbox application 144 within the production application 134 as described herein provides advantage(s) over the prior art. A typical sandbox environment is accessed outside the production environment. Thus, in the case of a web application (such as a SaaS application), a tenant's end user typically needs to login to the sandbox environment at a different URL than the production environment's URL. Here, a web page of the simulated sandbox application 144 (e.g., the web page 114) is accessed inside a web page of the production application 134 (e.g., the web page 108) and thus a user (e.g., the user 102) obtains the access to a simulation of a feature (e.g., the simulated feature 113) while using the production application 134 without having to leave the production application 134.

Client-side frameworks referred to herein above allow the client-side of a web application to perform operations without the need to go to the server-side of the application. The examples of such client-side frameworks are React, Vue.js, Angular, Lightning Web Component (LWC), etc. They are typically implemented using a component-based approach and support manipulating the web page displayed in the web browser typically via manipulating the UI components that compose the web page (which in turn manipulate the DOM of the web page). via the DOM of the web page). Such a component-based approach abstracts some or all parts of a web page into a collection of UI components. Each of the UI component may include one or more html UI elements and is a set of maintainable and reusable code (e.g., html code, javascript code, CSS code, etc.) that may be stored in one or more files. When used to construct a web page, the UI components may each have its own UI that a user views/interacts with, which can be updated/manipulated independently from other UI components. In some cases, one or more UI components may be nested as child UI components within a parent UI component. In such cases, the UI of the parent UI component is a composition of the UIs of the child UI components. Also, the UI components may communicate with each other, e.g., by one creating event(s) and another listening to event(s), by one publishing event(s) and another subscribing to event(s), etc.

For example, one type of such manipulations of UI components is navigation between UI components. Each UI component has a component-specific location identifier in the context of the location identifier (e.g., URL) of the web page. For example, "https://www.webpage.com/cmp1" may be the component-specific location identifier for a UI component that is on the web page with a location identifier of "https://www.webpage.com." In the replacement content example described herein, the previously presented content may be implemented as a first UI component that occupies a location on the web page. The presented information that replaces the previously presented content may be implemented as a second UI component that occupies the same location on the web page. In such a manner, navigation from the location identifier of the first UI component to the location identifier of the second UI component that shares the same position on the web page appears to the user as a replacement of displayed content as a result of the user clicking on the interactive UI element.

Figure 1B:
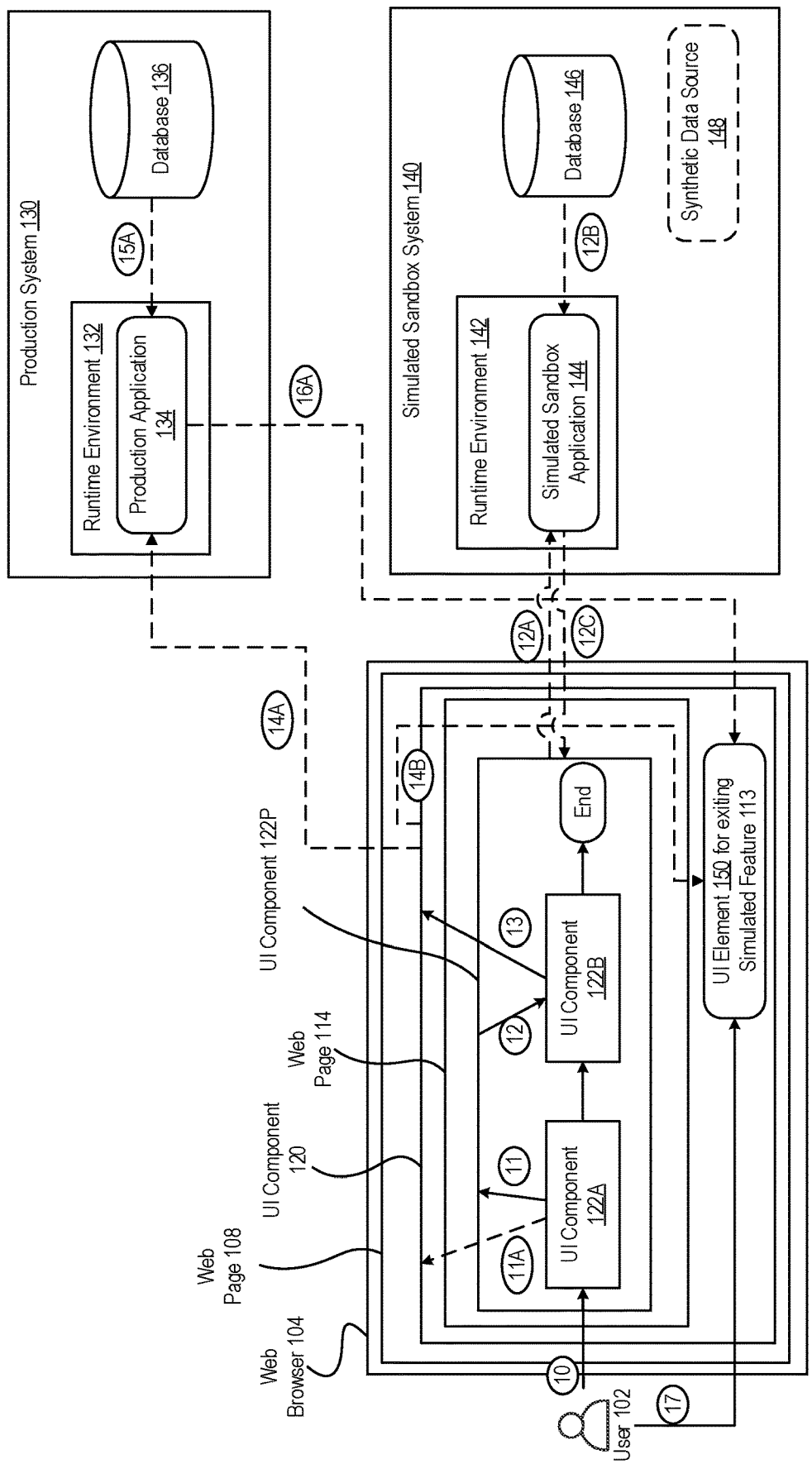
FIG. 1B is a diagram illustrating another aspect of simulated feature(s) in a simulated sandbox environment within a production environment according to some example implementations.

FIG. 1B is a diagram illustrating another aspect of simulated feature(s) in a simulated sandbox environment within a production environment according to some example implementations. The simulated feature 113 may simulate one or more capabilities that allow the user 102 to experience one or more flows of user interactions and may be implemented using navigation between UI components described herein. FIG. 1B continues the example illustrated in FIG. 1A. At operation 10 in FIG. 1B, the user 102 interacts with UI component 122A (e.g., via an interactive UI element that is part of the UI component). The UI component 122A is one of the UI components 122A-R that have been retrieved from the simulated sandbox application 144. While in some implementations the UI component 122A may be the UI component associated with the first user interaction in a flow of user interactions, in others it may be in the middle of the flow. In either case, the event handler code for the UI component 122A identifies a unique identifier for the UI component ("destination component id") that the flow of user interactions is configured to navigate to next, e.g., in response to a user interaction, such as the user interaction with UI component 122A. In this case, the destination component id identifies the UI component 122B, which is another UI component of the UI components 122A-R.

In response to a user interaction in a flow of user interactions, one or more operations may be performed to carry out a desired navigation step. Continuing with the above example, in response to the user interaction with the UI component 122A, at operation 11, based on a determination that the destination component id is present, an event is created to signal that navigation to different UI component needs to occur. In response, at operation 12, an event listener/handler at the top-level UI component of the web page 114 (sometimes referred to as the APP component), a UI component 122P (which is one of the UI components 122A-R), catches the event and initiates the navigation by signaling that the component-specific identifier for the UI component 112B is the destination of the navigation. In response, the navigation may be carried out (e.g., by the client-side framework that implements the UI components 122A-R) and, as a result, the UI component's 122B location identifier becomes the current location of the web page 114. Additionally, in some implementations, the UI component's 122P event handler code determines the UI component 122B is not within the DOM of the web page 114 and in response initiates a request for the code for the UI component 122B (operation 12A). In response, the code for the UI component 122B may be retrieved from database 146 (operation 12B) and may be sent back to the UI component 122P (operation 12C), at which point the UI component 122P is ready to initiate the navigation. See also FIG. 2B-C for example UIs for the operations 10-12.

In some implementations, in response to a user interaction in a flow of user interactions, one or more operations may be performed to communicate with the web page 108. Continuing with the above example, at operation 11A, a second event is created to notify the UI component 120 (which is inside the DOM of the web page 108) a navigation step has been initiated. In this case, the UI component 120 catches the event and may perform further processing based on the event, such as storing that information for tracking the state of the flow of user interactions within the web page 114.

One or more operations may be performed to determine a flow of user interactions has ended. Continuing with the above example, following operation 12, at operation 13, at the completion of the navigation from UI component 122A to UI component 122B, the code for the UI component 122B determines that the UI component 122B does not include a destination component id and determines the flow of user interactions has ended.

One or more operations may be performed based on a determination that a flow of user interactions has ended. Continuing with the above example, further at operation 13, the code for the UI component 122B creates an event that notifies UI component 120 that the flow of user interactions has ended (e.g., via window.postMessage( ) method in the implementations where the web page 114 is implemented using an iframe element). In some cases, the UI component 120 determines that a UI element 150 for exiting the simulated feature 113 exists in the DOM of the web page 108 and presents it in the web browser 14B (operation 14B). The UI element 150 may include an interactive UI element that upon a user interaction causes the removal of UI component 120 from the DOM for the web page 108. In other cases, the UI component 120 determines that the UI element 150 is not present in the DOM of the web page 108 and requests for its code from the production application (operation 14A). In response, the code is retrieved from the database 136 and is sent back to the web browser 104 for display and for the user 102 to interact with (operation 16A). See also FIG. 2D for an example UIs the operations 13-16A.

One or more operations may be performed to allow the user 102 to exit the simulated feature 113. Continuing with the above example, at operation 17, the user selects the UI element 150 to exit the simulated feature 113 and in response the UI component 120 is removed from the DOM for the web page 108 and consequently the web page 114 is removed from the web page 108. In such a manner, the access to the simulated sandbox application 144 is removed from the web page 108 and the user 102 is only provided with the access to the production application 134 (i.e., via the web page 108). In some implementations, the UI element 150 includes the ability for the user 102 to provide feedback. In other implementations, the UI element 150 includes the ability for the user 102 to enable the feature in the production application 134 that the simulated feature 113 simulates (e.g., when the feature is disabled in the production application 134). In yet other implementations, the UI element includes the ability for the user 102 to start the process of purchasing the license for the feature (e.g., when the user 102 does not have the license for the feature).

Figure 2A:
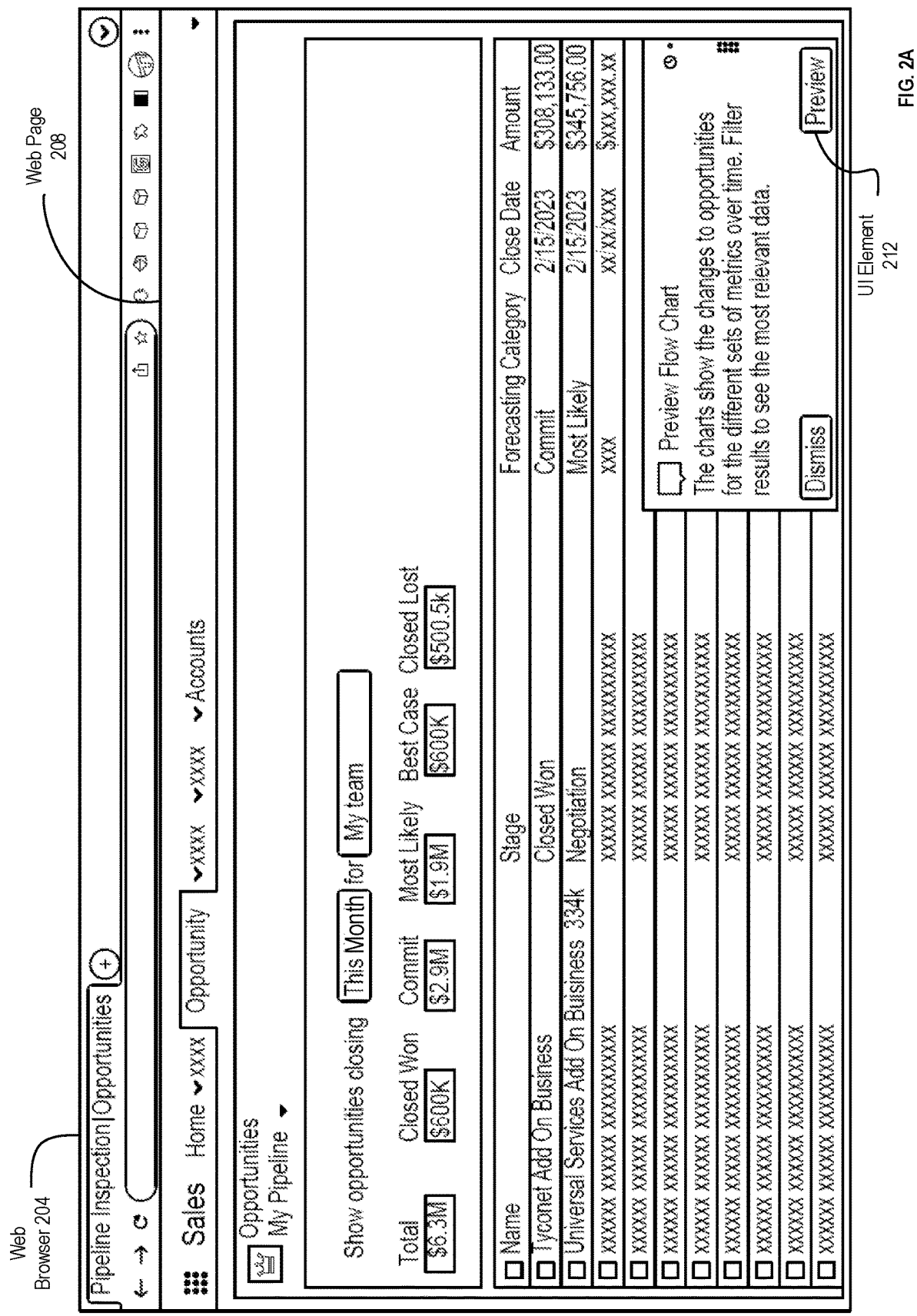
FIG. 2A is an example user interface (UI) illustrating simulated feature(s) in a simulated sandbox environment within a production environment according to some example implementations.

FIG. 2A is an example user interface (UI) illustrating simulated feature(s) in a simulated sandbox environment within a production environment according to some example implementations.

As shown, a web page browser 204 (similar to the web browser 104 in FIGS. 1A-B) displays a web page 208 (similar to the web page 108 in FIGS. 1A-B). The web page 208 is a web page of a sales application (similar to the production application 134 in FIGS. 1A-B). The sales application displays production data (similar to production data from database 136 in FIGS. 1A-B) and capabilities related to different aspects of sales, such as Opportunity, Accounts, etc. Opportunity is the currently displayed sales aspect, which is indicated by it being the selected navigation tab at the top of the web page 208. In particular, the Opportunity tab's current view displays data about the pipeline of opportunities associated with the user's team that are expected to close this month, such as each opportunity's current stage, forecasting category, close date, amount. The top of the current view displays the summary metrics grouped by forecasting category. The bottom of the current view displays a data table that includes detailed data for each opportunity. A prompt titled "Preview Flow Chart" displays at the bottom right of the current view and it includes a UI element 212 (similar to the interactive UI element 112 in FIG. 1A) that allows a user (e.g., the user 102 in FIGS. 1A-B) to access a simulated feature named "flow chart" (similar to the simulated feature 113 in FIGS. 1A-B).

Figure 2B:
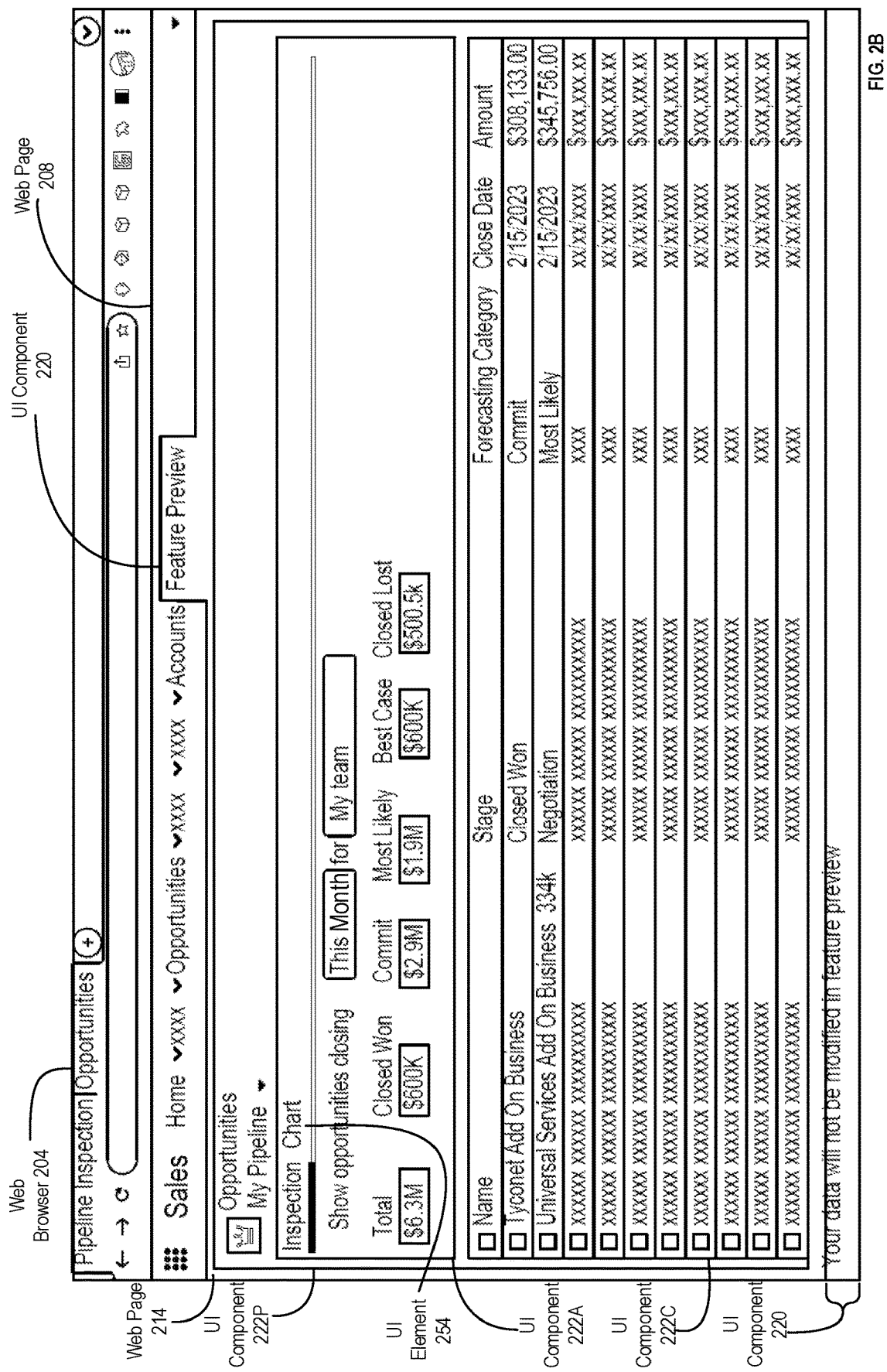
FIG. 2B is an example UI illustrating simulated feature(s) in a simulated sandbox environment within a production environment according to some example implementations.

FIG. 2B is an example UI illustrating simulated feature(s) in a simulated sandbox environment within a production environment according to some example implementations. FIG. 2B continues the example illustrated in FIG. 2A. Similar to how the UI component 120 is inserted into the web page 108 shown in FIG. 1A, the UI component 220 has been inserted into the web page 208 after a user (e.g., the user 102) selects the UI element 212 ("Preview") in FIG. 2A. As shown, the web page 208 displays Feature Preview as the currently selected navigation tab in the sales application where the Feature tab is the UI presentation of a UI component 220 (similar to the UI component 120 in FIGS. 1A-B). The bottom boundary of the UI component 220 is marked by the area that displays the text "Your data will not be modified in feature preview."

Similar to how the code for the web page 114 (including the code for the UI components 122A-R) is retrieved from the simulated sandbox application 144, the code for a web page 214 (which includes the code for UI components 222A, 222C, and 222P) is retrieved from a simulated sandbox sales application (not shown). As shown, the web page 214 displays within the UI component 220 and a UI component 222P, which is a container UI component that includes UI components 222A and 222C, displays within the web page 214.

Similar to the UI components 122A-R, the UI components 222A and 222C display some initial data, the source of which may be a copy of some production data from a production database (similar to database 136 in FIGS. 1A-B) or synthetic data (similar to synthetic data source 148 in FIGS. 1A-B). As shown, the initial data is similar to the summary metrics and data table in FIG. 2A.

Figure 2C:
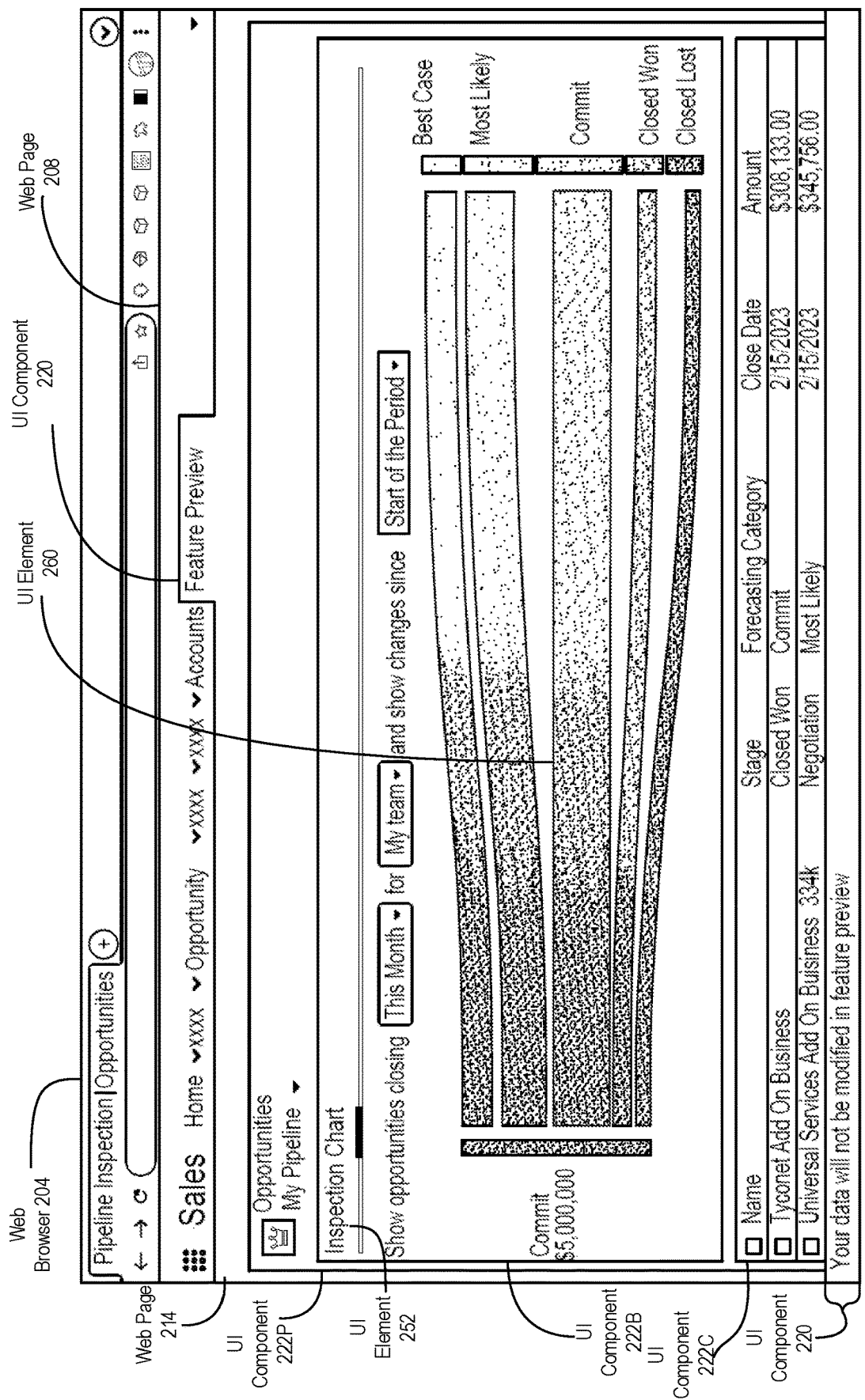
FIG. 2C is an example UI illustrating simulated feature(s) in a simulated sandbox environment within a production environment according to some example implementations.

In addition, the UI component 222A includes an interactive UI element 254. When a user (e.g., the user 102 in FIGS. 1A-B) interacts with the interactive UI element 254, navigation from the UI component 222A to the UI component 222B (shown in FIG. 2C) occurs (similarly to the navigation from the UI component 122A to the UI component 122B shown in FIG. 1B). As shown in FIG. 2C, the UI component 222B displays different information than the UI component 222A. As described herein, in such a manner, such navigation between two UI components that occupy the same position in the web page 214 has caused the replacement of displayed information, showing one user interaction in a flow of user interactions associated with the simulated feature flow chart. Such a user interaction shows the user that selecting the interactive UI element 254 allows them to access a capability, namely, the ability to view additional opportunity pipeline information in a flow chart format (see further description in FIG. 2C).

FIG. 2C is an example UI illustrating simulated feature(s) in a simulated sandbox environment within a production environment according to some example implementations. FIG. 2C continues the example illustrated in FIG. 2B. The UI component 222B displays opportunity pipeline information in a flow chart format. In particular, it shows how the opportunities' forecasting categories have developed over a period of time. For example, some of the "commit" type opportunities that were worth $5 million at the beginning of this month have changed to other types and only a subset of those commitments remains as the "commit" type.

Figure 2D:
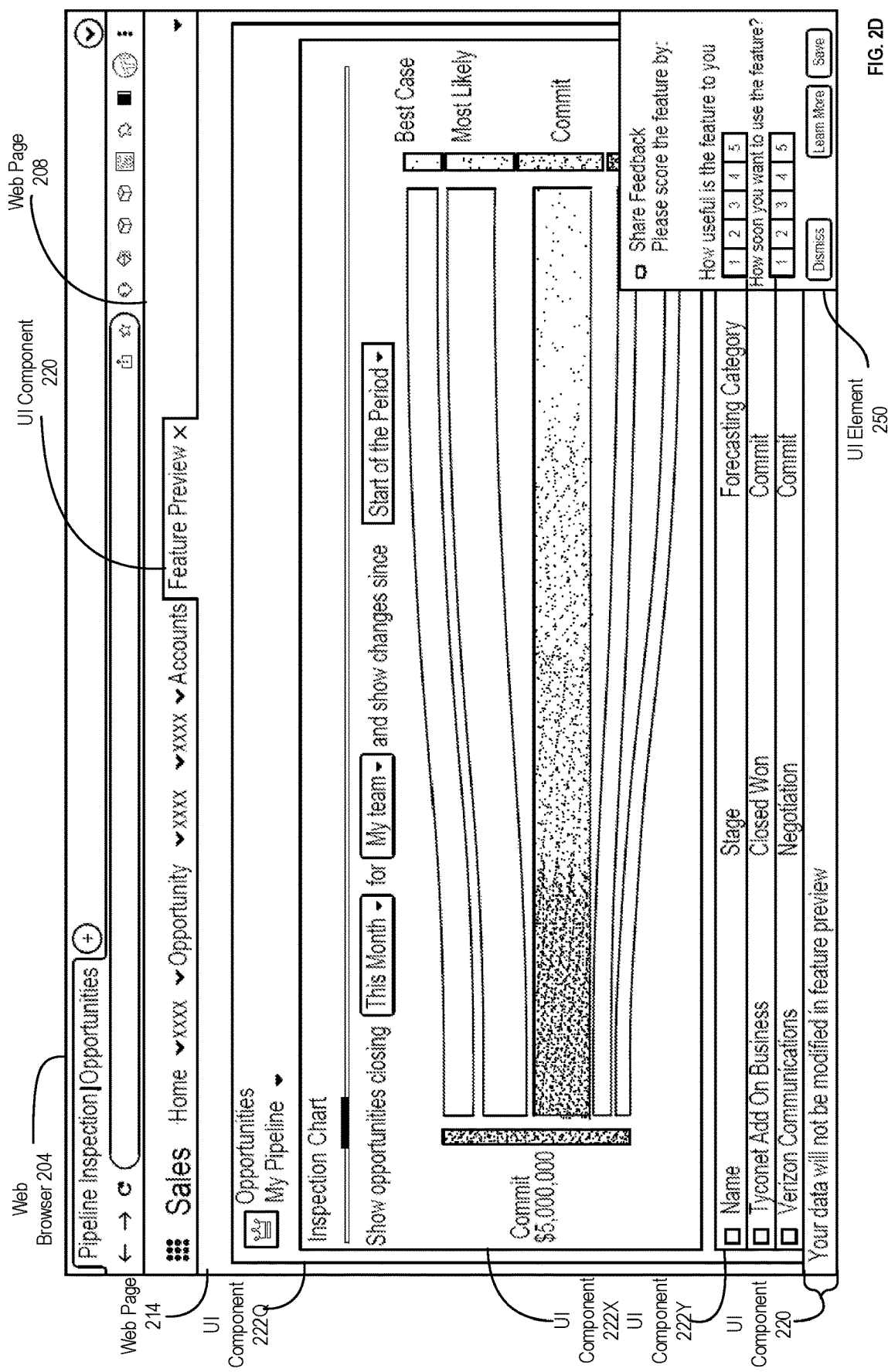
FIG. 2D is an example UI illustrating simulated feature(s) in a simulated sandbox environment within a production environment according to some example implementations.

As shown, the type of opportunities that remains as the commit type is shown as one of the five displayed flows. The flow includes an interactive UI element 260. When selected (e.g., clicked on), a different navigation step occurs, namely, the navigation from a one container UI component (UI component 222P) to another container UI component (UI component 222Q in FIG. 2D). As shown in FIG. 2D, the UI component 222Q displays UI component 222X and UI component 222Y that display the respectively updated content for the UI components 222A and 222B. In such a manner, such a navigation step has caused the replacement of the container UI component 222P with the container UI component 222Q to allow for the replacement of both UI components 222B and 222C (see further description in FIG. 2D).

Also as shown, the UI component 222B includes an interactive UI element 252. When selected, the interactive UI element 252 would allow the user to navigate back to the UI component 222A.

FIG. 2D is an example UI illustrating simulated feature(s) in a simulated sandbox environment within a production environment according to some example implementations. FIG. 2D continues the example illustrated in FIG. 2C. As shown, the UI component 222X displays the flow for the commit type of opportunities as the selected flow and the UI component 222Y displays the data table specific to the commit type of opportunities. Also as shown, a UI element 250 (similar to the UI element 150 in FIG. 1B) is displayed at the bottom of the web page 208 and prompts the user to provide feedback for the simulated feature flow chart. The UI element 250 also includes a save button that allows the user to select and exit the simulated feature flow chart. In this implementation, selecting the UI element 250 both saves the feedback provided by the user (e.g., to be reviewed by an administrator, who may determine whether to enable the feature or purchase the license for it (e.g., based on feedback data from the users)), and exits the simulated feature.

Figure 3:
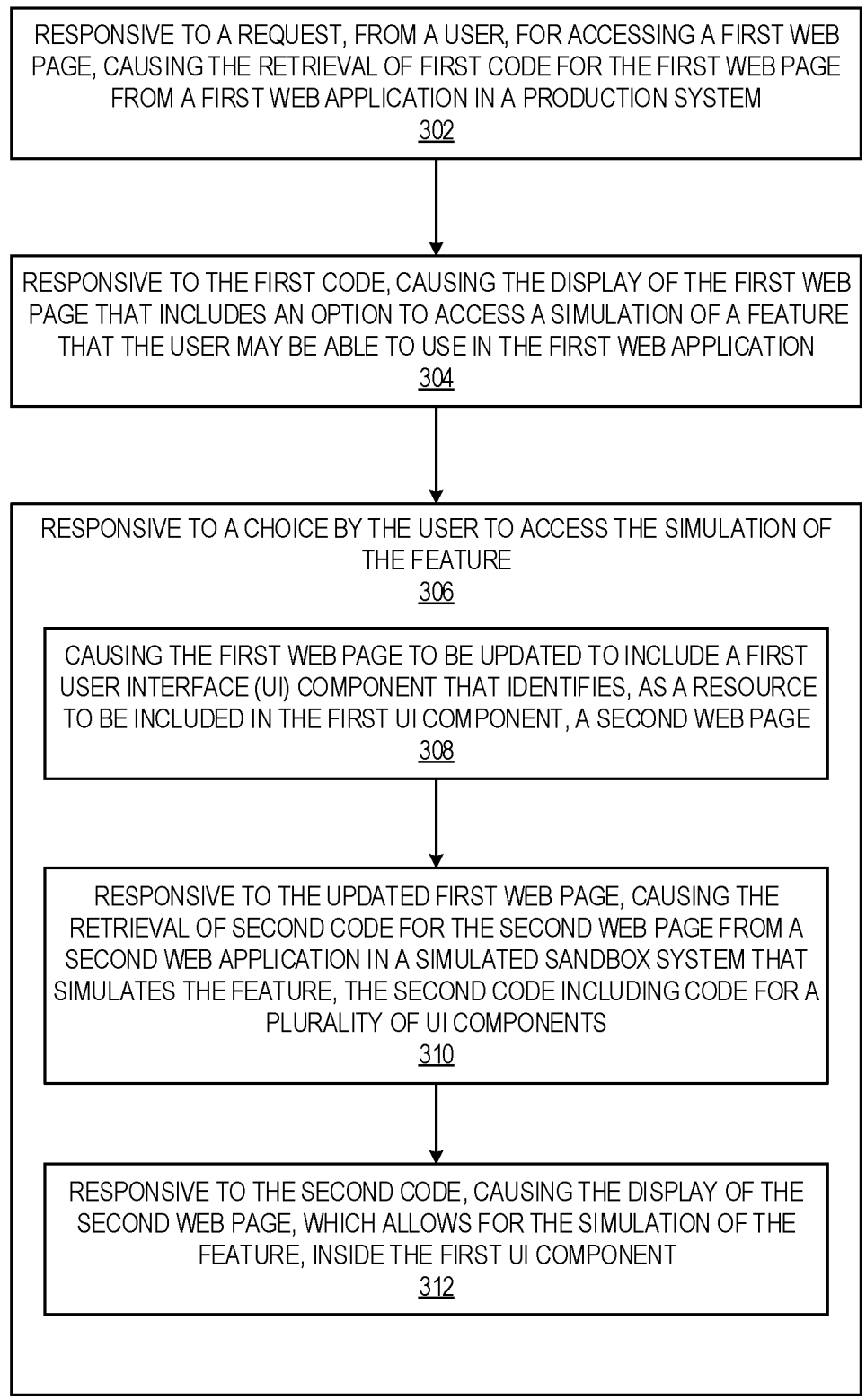
FIG. 3 is a flow diagram illustrating one aspect of simulated feature(s) in a simulated sandbox environment within a production environment according to some example implementations.

FIG. 3 is a flow diagram illustrating one aspect of simulated feature(s) in a simulated sandbox environment within a production environment according to some example implementations. The exemplary operations illustrated in FIG. 3 are the operations for accessing simulated feature(s) in a simulated sandbox environment within a production environment. The operations of FIG. 3 may be performed as described in further details with respect to FIGS. 1A-B and 2A-D. At operation 302, responsive to a request, from a user, for accessing a first web page (e.g., the web page 108), first code for the first web page is caused to be retrieved from a first web application (e.g., the production application 134) in a production system (e.g., the production system 130).

The flow of operations moves to operation 304, at which, responsive to the first code, the first web page is caused to be displayed where the first web page includes an option to access a simulation of a feature (e.g., the simulated feature 113) that the user may be able to use in the first web application.

The flow of operations moves to operation 306, at which one or more operations (e.g., operations 308, 310, and/or 312) are performed responsive to a choice by the user to access the simulation of the feature. The flow of operations moves to operation 308, at which the first web page is caused to be updated to include a first user interface (UI) component that identifies, as a resource to be included in the first UI component, a second web page. The flow of operations moves to operation 310, at which, responsive to the updated first web page, second code for the second web page is retrieved from a second web application in a simulated sandbox system that simulates the feature where the second code includes code for a plurality of UI components (e.g., UI components 122A-R).

The flow of operations moves to operation 312, at which, responsive to the second code, the second web page is caused to be displayed inside the first UI component, which allows for the simulation of the feature. In some implementations, the plurality of UI components includes one or more UI components associated with a different UI component on the second web page via a user interaction. In such implementations, one or more operations are performed by the simulation of the feature, responsive to a first user interaction with a second UI component (e.g., UI component 122A) of the one or more UI components. For instance, the flow of operations moves to an operation where the second UI component is caused to navigate to a third UI component (e.g., UI component 122B) on the second web page. The flow of operations moves to another operation where the second UI component is caused to send, to the first UI component, a first event indicating that a navigation step has occurred.

Under such implementations, in some implementations, the third UI component is not associated with a different UI component on the second web page via a user interaction. In such implementations, one or more further operations are performed by the simulation of feature. For example, responsive to the navigation from the second UI component to the third UI component, the third UI component is caused to send, to the first UI component, a second event indicating that no further navigation steps exist. Further in this example, in some implementations, one or more further operations are performed by the simulation of the feature.

For instance, responsive to the second event, an option to provide feedback for the feature is caused to be displayed. Responsive to receiving the feedback from the user, the feedback is caused to be stored and the first UI component is caused to be removed from the first web page, which removes the second web page from the first web page. Further in this example, in other implementations, one or more further operations are performed by the simulation of the feature. For instance, responsive to the second event, an option is caused to be displayed where the option allows the feature in the first web application to be enabled. Responsive to receiving a choice to enable the feature from the user, the feature is caused to be enabled in the first web application and the first UI component is caused to be removed from the first web page, which removes the second web page from the first web page.

Example Electronic Devices and Environments
Electronic Device and Machine-Readable Media One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users.

Users can have one or more roles, such as administrator, programmer/developer, and end user roles. As an administrator, a user typically uses electronic devices to administer them for other users, and thus an administrator often works directly and/or indirectly with server devices and client devices.

Figure 4A:
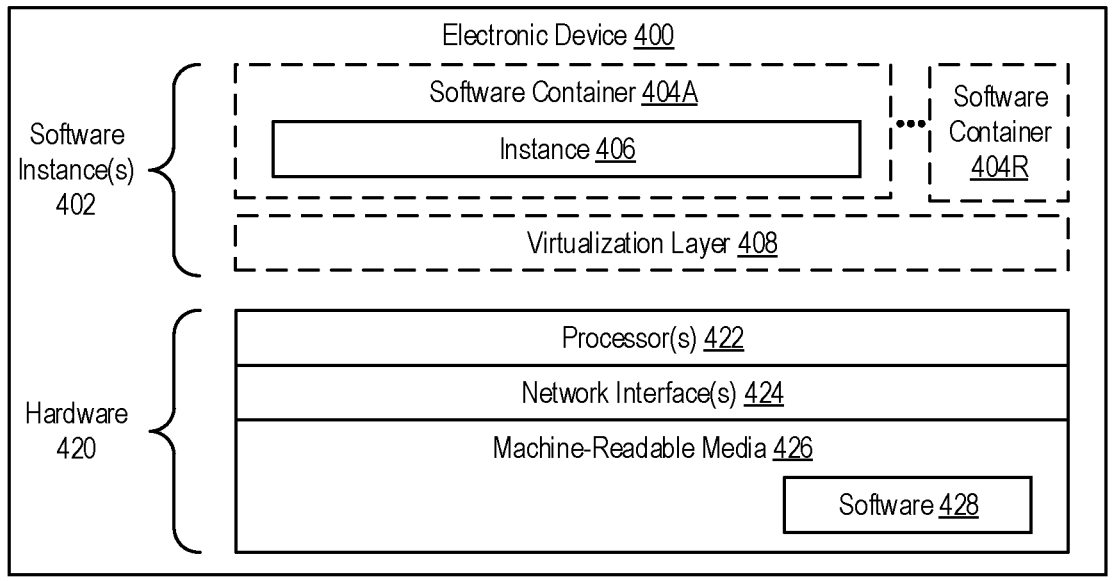
FIG. 4A is a block diagram illustrating an electronic device according to some example implementations.

FIG. 4A is a block diagram illustrating an electronic device 400 according to some example implementations. FIG. 4A includes hardware 420 comprising a set of one or more processor(s) 422, a set of one or more network interfaces 424 (wireless and/or wired), and machine-readable media 426 having stored therein software 428 (which includes instructions executable by the set of one or more processor(s) 422). The machine-readable media 426 may include non-transitory and/or transitory machine-readable media. Each of the previously described clients and the simulated sandbox application 144 may be implemented in one or more electronic devices 400. In one implementation: 1) each of the clients is implemented in a separate one of the electronic devices 400 (e.g., in end user devices where the software 428 represents the software to implement clients to interface directly and/or indirectly with the simulated sandbox application 144 (e.g., software 428 represents a web browser, a native client, a portal, a command-line interface, and/or an application programming interface (API) based upon protocols such as Simple Object Access Protocol (SOAP), Representational State Transfer (REST), etc.)); 2) the simulated sandbox application 144 is implemented in a separate set of one or more of the electronic devices 400 (e.g., a set of one or more server devices where the software 428 represents the software to implement the simulated sandbox application 144); and 3) in operation, the electronic devices implementing the clients and the simulated sandbox application 144 would be communicatively coupled (e.g., by a network) and would establish between them (or through one or more other layers and/or or other services) connections for submitting a request for a web page to the simulated sandbox application 144 and returning the code for the web page to the clients. Other configurations of electronic devices may be used in other implementations (e.g., an implementation in which the client and the simulated sandbox application 144 are implemented on a single one of electronic device 400).

During operation, an instance of the software 428 (illustrated as instance 406 and referred to as a software instance; and in the more specific case of an application, as an application instance) is executed. In electronic devices that use compute virtualization, the set of one or more processor(s) 422 typically execute software to instantiate a virtualization layer 408 and one or more software container(s) 404A-404R (e.g., with operating system-level virtualization, the virtualization layer 408 may represent a container engine (such as Docker Engine by Docker, Inc. or rkt in Container Linux by Red Hat, Inc.) running on top of (or integrated into) an operating system, and it allows for the creation of multiple software containers 404A-404R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-404R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 428 is executed within the software container 404A on the virtualization layer 408. In electronic devices where compute virtualization is not used, the instance 406 on top of a host operating system is executed on the "bare metal" electronic device 400. The instantiation of the instance 406, as well as the virtualization layer 408 and software containers 404A-404R if implemented, are collectively referred to as software instance(s) 402.

Alternative implementations of an electronic device may have numerous variations from that described above. For example, customized hardware and/or accelerators might also be used in an electronic device.

Example Environment

Figure 4B:
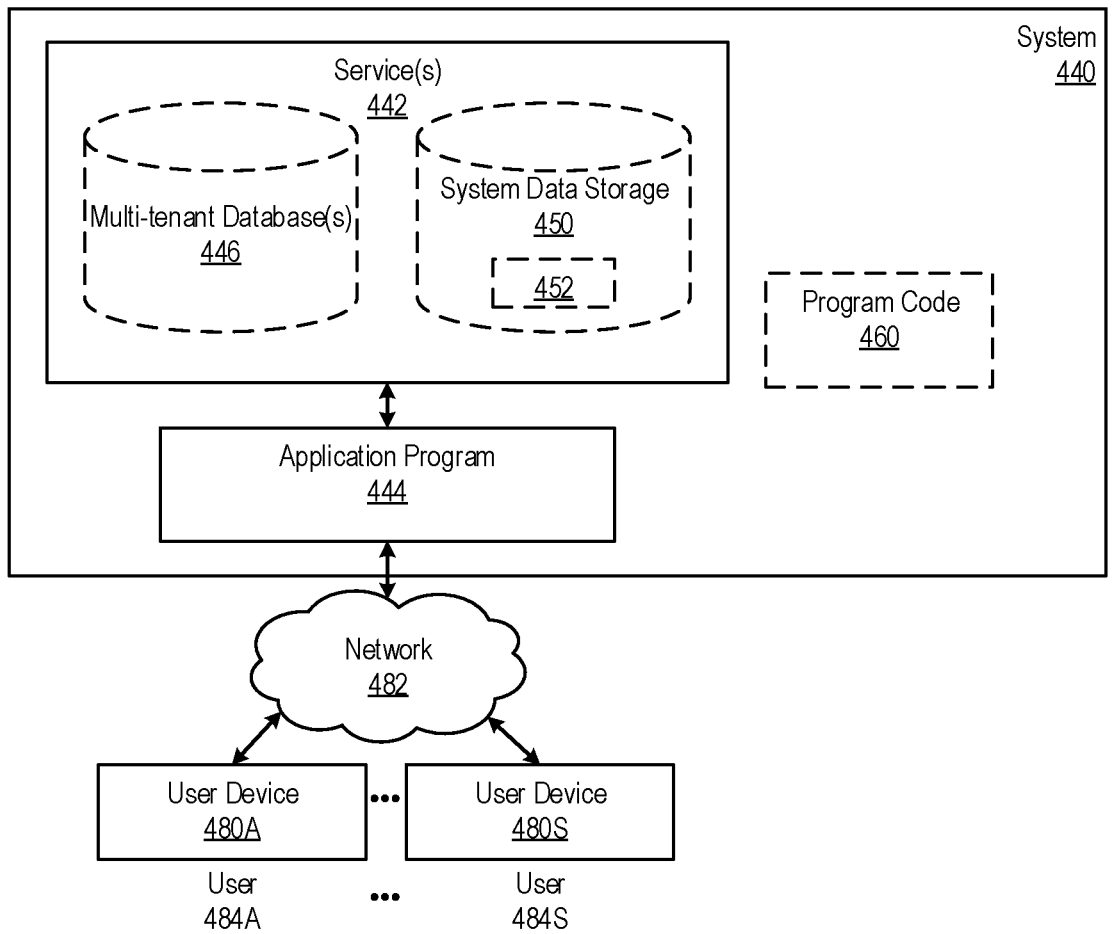
FIG. 4B is a block diagram of a deployment environment according to some example implementations.

FIG. 4B is a block diagram of a deployment environment according to some example implementations. A system 440 includes hardware (e.g., a set of one or more server devices) and software to provide service(s) 442, including the simulated sandbox application 144. In some implementations the system 440 is in one or more datacenter(s). These datacenter(s) may be: 1) first party datacenter(s), which are datacenter(s) owned and/or operated by the same entity that provides and/or operates some or all of the software that provides the service(s); and/or 2) third-party datacenter(s), which are datacenter(s) owned and/or operated by one or more different entities than the entity that provides the service(s) 442 (e.g., the different entities may host some or all of the software provided and/or operated by the entity that provides the service(s) 442). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 440 is coupled to user devices 480A-480S over a network 482. The service(s) 442 may be on-demand services that are made available to one or more of the users 484A-484S working for one or more entities other than the entity which owns and/or operates the on-demand services (those users sometimes referred to as outside users) so that those entities need not be concerned with building and/or maintaining a system, but instead may make use of the service(s) 442 when needed (e.g., when needed by the users 484A-484S). The service(s) 442 may communicate with each other and/or with one or more of the user devices 480A-480S via one or more APIs (e.g., a REST API). In some implementations, the user devices 480A-480S are operated by users 484A-484S, and each may be operated as a client device and/or a server device. In some implementations, one or more of the user devices 480A-480S are separate ones of the electronic device 400 or include one or more features of the electronic device 400.

In some implementations, the system 440 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to as a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 440 is a multi-tenant cloud computing architecture supporting multiple services, such as one or more of the following types of services: Software-as-a-service (SaaS), such as a simulated sandbox application 144; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 440 may include an application platform 444 that enables PAAS for creating, managing, and executing one or more applications developed by the provider of the application platform 444, users accessing the system 440 via one or more of user devices 480A-480S, or third-party application developers accessing the system 440 via one or more of user devices 480A-480S.

In some implementations, one or more of the service(s) 442 may use one or more multi-tenant databases 446, as well as system data storage 450 for system data 452 accessible to system 440. In certain implementations, the system 440 includes a set of one or more servers that are running on server electronic devices and that are configured to handle requests for any authorized user associated with any tenant (there is no server affinity for a user and/or tenant to a specific server). The user devices 480A-480S communicate with the server(s) of system 440 to request and update tenant-level data and system-level data hosted by system 440, and in response the system 440 (e.g., one or more servers in system 440) automatically may generate one or more Structured Query Language (SQL) statements (e.g., one or more SQL queries) that are designed to access the desired information from the multi-tenant database(s) 446 and/or system data storage 450.

In some implementations, the service(s) 442 are implemented using virtual applications dynamically created at run time responsive to queries from the user devices 480A-480S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 460 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 444 includes an application setup mechanism that supports application developers' creation and management of applications, which may be saved as metadata by save routines. Invocations to such applications, including the simulated sandbox application 144, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 482 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 440 and the user devices 480A-480S.

Each user device 480A-480S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 440. For example, the user interface device can be used to access data and applications hosted by system 440, and to perform searches on stored data, and otherwise allow one or more of users 484A-484S to interact with various GUI pages that may be presented to the one or more of users 484A-484S. User devices 480A-480S might communicate with system 440 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 480A-480S might include an HTTP client, commonly referred to as a "browser," for sending and receiving HTTP messages to and from server(s) of system 440, thus allowing users 484A-484S of the user devices 480A-480S to access, process and view information, pages and applications available to it from system 440 over network 482.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

The invention claimed is:

1. A non-transitory machine-readable storage medium that provides instructions that, if executed by a processor configurable to cause said processor to perform operations comprising:
responsive to a request, from a user, for accessing a first web page, causing the retrieval of first code for the first web page from a first web application in a production system;
responsive to the first code, causing the display of the first web page that includes an option to access a simulation of a feature that the user may be able to use in the first web application; and
responsive to a choice by the user to access the simulation of the feature,
causing the first web page to be updated to include a first user interface (UI) component that identifies, as a resource to be included in the first UI component, a second web page,
responsive to the updated first web page, causing the retrieval of second code for the second web page from a second web application in a simulated sandbox system that simulates the feature, the second code including code for a plurality of UI components,
responsive to the second code, causing the display of the second web page, which allows for the simulation of the feature, inside the first UI component; and
causing the display of an option to enable the feature in the first web application; and
responsive to receiving a choice to enable the feature from the user, causing:
the feature to be enabled in the first web application, and
the first UI component to be removed from the first web page, which removes the second web page from the first web page.

2. The non-transitory machine-readable storage medium of claim 1, wherein the plurality of UI components includes one or more UI components associated with a different UI component on the second web page via a user interaction, and wherein the simulation of the feature performs further operations comprising:
responsive to a first user interaction with a second UI component of the one or more UI components,
causing navigation from the second UI component to a third UI component on the second web page, and
causing the second UI component to send, to the first UI component, a first event indicating that a navigation step has occurred.

3. The non-transitory machine-readable storage medium of claim 2, wherein the third UI component is not associated with a different UI component on the second web page via a user interaction, the further operations further comprising:
responsive to the navigation from the second UI component to the third UI component, causing the third UI component to send, to the first UI component, a second event indicating that no further navigation steps exist.

4. The non-transitory machine-readable storage medium of claim 3, the operations further comprising:
responsive to the second event, causing the display of an option to provide feedback for the feature; and
responsive to receiving the feedback from the user, causing:
the feedback to be stored, and the first UI component to be removed from the first web page, which removes the second web page from the first web page.

5. The non-transitory machine-readable storage medium of claim 1, wherein causing the display of the second web page inside the updated first UI component further includes retrieving a set of production data and displaying the set of production data on the second web page.

6. The non-transitory machine-readable storage medium of claim 1, wherein causing the display of the second web page inside the updated first UI component further includes retrieving a set of synthetic data and displaying the set of synthetic data on the second web page.

7. A method, implemented by an electronic device, to allow a user to try out a feature, the method comprising:
responsive to a request, from a user, for accessing a first web page, causing the retrieval of first code for the first web page from a first web application in a production system;
responsive to the first code, causing the display of the first web page that includes an option to access a simulation of a feature that the user may be able to use in the first web application;
responsive to a choice by the user to access the simulation of the feature,
causing the first web page to be updated to include a first user interface (UI) component that identifies, as a resource to be included in the first UI component, a second web page,
responsive to the updated first web page, causing the retrieval of second code for the second web page from a second web application in a simulated sandbox system that simulates the feature, the second code including code for a plurality of UI components, and
responsive to the second code, causing the display of the second web page, which allows for the simulation of the feature, inside the first UI component; and
causing the display of an option to enable the feature in the first web application; and
responsive to receiving a choice to enable the feature from the user, causing:
the feature to be enabled in the first web application, and
the first UI component to be removed from the first web page, which removes the second web page from the first web page.

8. The method of claim 7, wherein the plurality of UI components includes one or more UI components associated with a different UI component on the second web page via a user interaction, and wherein the simulation of the feature performs further operations comprising:
responsive to a first user interaction with a second UI component of the one or more UI components,
causing navigation from the second UI component to a third UI component on the second web page, and
causing the second UI component to send, to the first UI component, a first event indicating that a navigation step has occurred.

9. The method of claim 8, wherein the third UI component is not associated with a different UI component on the second web page via a user interaction, the further operations further comprising:
responsive to the navigation from the second UI component to the third UI component, causing the third UI component to send, to the first UI component, a second event indicating that no further navigation steps exist.

10. The method of claim 9, the operations further comprising:
responsive to the second event, causing the display of an option to provide feedback for the feature; and
responsive to receiving the feedback from the user, causing:
the feedback to be stored, and
the first UI component to be removed from the first web page, which removes the second web page from the first web page.

11. The method of claim 7, wherein causing the display of the second web page inside the updated first UI component further includes retrieving a set of production data and displaying the set of production data on the second web page.

12. The method of claim 7, wherein causing the display of the second web page inside the updated first UI component further includes retrieving a set of synthetic data and displaying the set of synthetic data on the second web page.

13. An electronic device configured to allow a user to try out a feature, the electronic device comprising:
a processor; and
a non-transitory machine-readable storage medium that provides instructions that, if executed by the processor, are configurable to cause the electronic device to perform operations comprising:
responsive to a request, from a user, for accessing a first web page, causing the retrieval of first code for the first web page from a first web application in a production system;
responsive to the first code, causing the display of the first web page that includes an option to access a simulation of a feature that the user may be able to use in the first web application;
responsive to a choice by the user to access the simulation of the feature,
causing the first web page to be updated to include a first user interface (UI) component that identifies, as a resource to be included in the first UI component, a second web page,
responsive to the updated first web page, causing the retrieval of second code for the second web page from a second web application in a simulated sandbox system that simulates the feature, the second code including code for a plurality of UI components, and
responsive to the second code, causing the display of the second web page, which allows for the simulation of the feature, inside the first UI component; and
causing the display of an option to enable the feature in the first web application; and
responsive to receiving a choice to enable the feature from the user, causing:
the feature to be enabled in the first web application, and
the first UI component to be removed from the first web page, which removes the second web page from the first web page.

14. The electronic device of claim 13, wherein the plurality of UI components includes one or more UI components associated with a different UI component on the second web page via a user interaction, and wherein the simulation of the feature performs further operations comprising:
responsive to a first user interaction with a second UI component of the one or more UI components,
causing navigation from the second UI component to a third UI component on the second web page, and
causing the second UI component to send, to the first UI component, a first event indicating that a navigation step has occurred.

15. The electronic device of claim 14, wherein the third UI component is not associated with a different UI component on the second web page via a user interaction, the further operations further comprising:
responsive to the navigation from the second UI component to the third UI component, causing the third UI component to send, to the first UI component, a second event indicating that no further navigation steps exist.

16. The electronic device of claim 15, the operations further comprising:
responsive to the second event, causing the display of an option to provide feedback for the feature; and
responsive to receiving the feedback from the user, causing:
the feedback to be stored, and
the first UI component to be removed from the first web page, which removes the second web page from the first web page.

17. The electronic device of claim 13, wherein causing the display of the second web page inside the updated first UI component further includes retrieving a set of production data and displaying the set of production data on the second web page.

18. The electronic device of claim 13, wherein causing the display of the second web page inside the updated first UI component further includes retrieving a set of synthetic data and displaying the set of synthetic data on the second web page.

* * * * *